US010896617B2

(12) United States Patent
Casek et al.

(10) Patent No.: US 10,896,617 B2
(45) Date of Patent: Jan. 19, 2021

(54) TRANSMITTING SURVEILLANCE SIGNALS IN RESPONSE TO A RECEIVED SIGNAL

(71) Applicant: Honeywell International s.r.o., Chodov (CZ)

(72) Inventors: Petr Casek, Brno (CZ); Pavel Klang, Brno (CZ)

(73) Assignee: Honeywell International s.r.o., Chodov (CZ)

( * ) Notice: Subject to any disclaimer, the term of this patent is extended or adjusted under 35 U.S.C. 154(b) by 0 days.

(21) Appl. No.: 16/720,805

(22) Filed: Dec. 19, 2019

(65) Prior Publication Data
US 2020/0349851 A1 Nov. 5, 2020

Related U.S. Application Data

(60) Provisional application No. 62/840,852, filed on Apr. 30, 2019.

(51) Int. Cl.
*G08G 5/00* (2006.01)
*H04H 20/55* (2008.01)

(52) U.S. Cl.
CPC ......... *G08G 5/0013* (2013.01); *G08G 5/0008* (2013.01); *G08G 5/0069* (2013.01); *G08G 5/0082* (2013.01); *H04H 20/55* (2013.01)

(58) Field of Classification Search
CPC .. G08G 5/0013; G08G 5/0008; G08G 5/0082; G08G 5/0069; H04H 20/55
See application file for complete search history.

(56) References Cited

U.S. PATENT DOCUMENTS 7,969,346 B2  6/2011  Franceschini et al.
8,838,298 B2  9/2014  Hinnant et al.
(Continued)

FOREIGN PATENT DOCUMENTS

CN  107179778 A  9/2017
EP   3147887 A1  3/2017

OTHER PUBLICATIONS

Orrell et al., "Small Unmanned Aircraft System (SUAS) Automatic Dependent Surveillance-Broadcast (ADS-B) Like Surveillance Concept of Operations: A Path Forward for Small UAS Surveillance," IEEE, AIAA 36th Digital Avionics Systems Conference (DASC), Sep. 17-21, 2017, 10 pp.

(Continued)

*Primary Examiner* — Xiao En Mo
(74) *Attorney, Agent, or Firm* — Shumaker & Sieffert, P.A.

(57) ABSTRACT

In some examples, a system includes a receiver configured to receive communication from a traffic management system and a transmitter configured to transmit surveillance messages. The system also includes processing circuitry configured to determine, in a first instance, that the receiver has not received a command signal from the traffic management system. The processing circuitry is also configured to suppress transmission of surveillance messages by the transmitter in response to determining that the receiver has not received the command signal. The processing circuitry is further configured to determine, in a second instance, that the receiver received the command signal from the traffic management system. The processing circuitry is configured to cause the transmitter to transmit the surveillance messages in response to determining that the receiver received the command signal.

20 Claims, 4 Drawing Sheets

(56) References Cited

U.S. PATENT DOCUMENTS

| | | |
|---|---|---|
| 9,311,821 B2 | 4/2016 | Melum et al. |
| 9,576,793 B2 | 2/2017 | Abbondanza |
| 10,054,941 B1 * | 8/2018 | Beard .................... G08G 5/006 |
| 2003/0236623 A1 | 12/2003 | Ybarra et al. |
| 2009/0322588 A1 | 12/2009 | Rolfe et al. |
| 2019/0096143 A1 | 3/2019 | Weed et al. |
| 2019/0197907 A1 * | 7/2019 | Beard .................. G08G 5/0082 |

OTHER PUBLICATIONS

Ramsey, "The Case for Low Power ADS-B for Drones," uAvioni, accessed from https://uavionix.com/the-case-for-low-power-ads-b/, accessed on Apr. 13, 2019, 7 pp.

Extended Search Report from counterpart European Application No. 20169237.3, dated Sep. 15, 2020, 9 pp.

Response to Extended Search Report dated Sep. 15, 2020, from counterpart European Application No. 20169237.3, filed Dec. 1, 2020, 14 pp.

\* cited by examiner

TRANSMITTING SURVEILLANCE SIGNALS IN RESPONSE TO A RECEIVED SIGNAL

This application claims benefit to U.S. Provisional Application No. 62/840,852, filed on Apr. 30, 2019, the entire content of which is incorporated herein by reference.

GOVERNMENT INTEREST

The project leading to this application has received funding from the Single European Sky Air Traffic Management Research (SESAR) Joint Undertaking under grant agreement No. 783198 under European Union's Horizon 2020 research and innovation programme.

TECHNICAL FIELD

This disclosure relates to status broadcasts and position reporting for vehicles.

BACKGROUND

Drones, unmanned aerial vehicles (UAVs), and urban air mobility devices are part of a rapidly growing market of new airspace users. These new airspace users can include cooperative traffic surveillance systems that are interoperable with existing manned aviation systems, such as automatic-dependent surveillance—broadcast (ADS-B). ADS-B Out capability improves the traffic situation awareness for most manned aircraft, but the mandated deployment of ADS-B Out systems does not cover all types of airspace users. ADS-B for commercial aircraft commonly uses a frequency of 1090 megahertz (MHz).

In the United States, the Federal Aviation Administration has mandated ADS-B Out for certain types of general aviation (GA) aircraft. Some ADS-B devices for general aviation aircraft use a different frequency than 1090 megahertz. One example of a device that uses a different frequency is a universal access transceiver (UAT), which does not use the same frequency as ADS-B for commercial aircraft. UAT commonly uses a frequency of 978 MHz. A receiving aircraft needs a dual frequency receiver to receive both ADS-B and UAT signals, or the receiving aircraft must wait for a ground-based rebroadcast on 1090 MHz. Thus, UAT systems can cause issues for interoperability. In Europe, ADS-B Out devices use only 1090 MHz frequency. There is no mandate to use ADS-B for GA aircraft and majority of rotorcraft in Europe, which reduces the operational benefits of ADS-B in lower-altitude airspace.

It is possible for a wider use of ADS-B Out for drones, UAVs, and urban air mobility devices. However, there is a risk of local congestion at the 1090 MHz frequency due to interference caused by having a large number of such devices in relatively small area. There are standards for the performance and functionality of manned aircraft and increasing the number of ADS-B Out users can affect the performance of ADS-B systems in aircraft.

Furthermore, there is an expectation that the management of unmanned aircraft will include some kind of Unmanned Traffic Management (UTM), which will use a different frequency (e.g., mobile network) for surveillance. However, the UTM may not solve the interoperability issue between unmanned aircraft and manned aircraft, such as commercial aircraft.

SUMMARY

In general, this disclosure relates to systems, devices, and techniques for selectively transmitting surveillance signals based on a received signal and/or based on whether a vehicle is located within a predefined region. A system can suppress the transmission of surveillance messages in response to determining that the system has not received a command signal from a traffic management system such as an air traffic control system. In response to determining that the system has received the command signal, the system can cause a transmitter to transmit surveillance messages. The techniques of this disclosure may result in less interference from surveillance transmissions because the traffic management system can cause vehicles to broadcast, or refrain from broadcasting, surveillance messages.

In some examples, a system includes a receiver configured to receive a first signal, a transmitter, and processing circuitry configured to determine whether the receiver has received the first signal. The processing circuitry is also configured to cause the transmitter to refrain from transmitting surveillance signals in response to determining that receiver has not received the first signal. The processing circuitry is further configured to cause the transmitter to transmit the surveillance signals in response to determining that receiver has received the first signal.

In some examples, a method includes determining, by processing circuitry in a first instance, that a receiver has not received a first signal. The method also includes suppressing, by the processing circuitry, transmission of surveillance signals by a transmitter in response to determining that the receiver has not received the first signal. The method further includes determining, by the processing circuitry in a second instance, that the receiver received the first signal. The method includes causing, by the processing circuitry, the transmitter to transmit the surveillance signals in response to determining that the receiver received the first signal.

In some examples, a device includes a computer-readable medium having executable instructions stored thereon, configured to be executable by processing circuitry for causing the processing circuitry to determine, in a first instance, that a receiver has not received a first signal. The instructions also cause the processing circuitry to suppress transmission of surveillance signals by a transmitter in response to determining that receiver has not received the first signal. The instructions further cause the processing circuitry to determine, in a second instance, that the receiver received the first signal. The instructions cause the processing circuitry to cause the transmitter to transmit the surveillance signals in response to determining that the receiver received the first signal.

The details of one or more examples of the disclosure are set forth in the accompanying drawings and the description below. Other features, objects, and advantages will be apparent from the description, drawings, and claims.

DETAILED DESCRIPTION

Various examples are described below for selectively transmitting surveillance signals in response to receiving a signal or determining that a transmitter is located in a predefined region. Selective transmission of surveillance signals can reduce the congestion of surveillance signals at a particular frequency. In addition, selective transmission of surveillance signals can reduce the overall power consumption of the transmitter, which can improve the efficiency of the vehicle and/or allow a reduction of the size, weight, and capacity of a power source (e.g., a battery).

Figure 1:
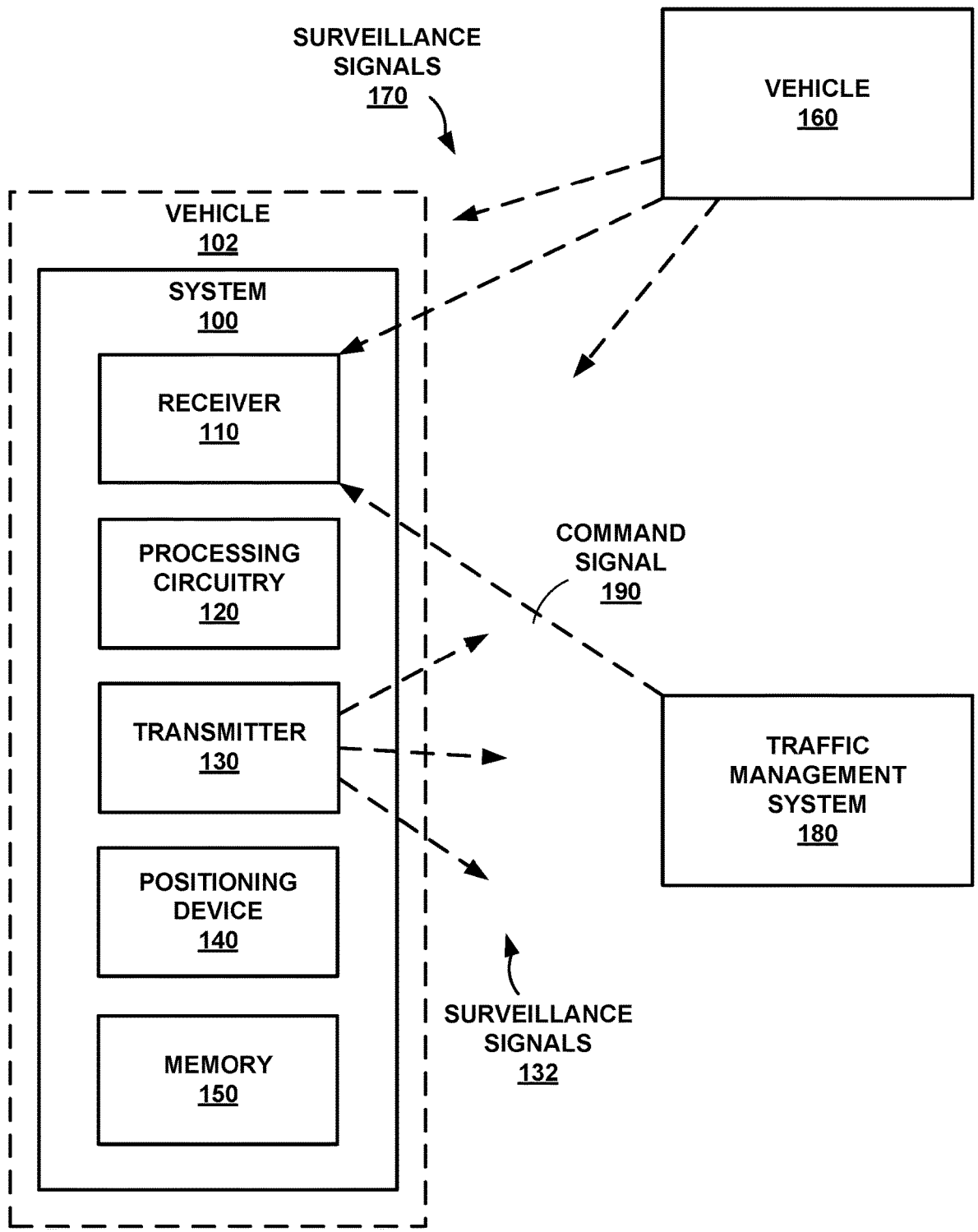
FIG. 1 is a conceptual block diagram of a system for selectively transmitting surveillance signals, in accordance with some examples of this disclosure.

FIG. 1 is a conceptual block diagram of a system 100 for selectively transmitting surveillance signals 132, in accordance with some examples of this disclosure. System 100 includes receiver 110, processing circuitry 120, transmitter 130, positioning device 140, and memory 150. System 100 may include additional elements not shown in FIG. 1, such as an altimeter, an accelerometer, an attitude and heading reference system, and/or other sensors and means for determining velocity and other parameters of vehicle 102. Although FIG. 1 shows receiver 110, processing circuitry 120, transmitter 130, positioning device 140, and memory 150 as separate components for ease of illustration, these components may be separate or highly integrated in an actual implementation.

System 100 may be mounted on, attached to, and/or built-in to vehicle 102. The techniques of this disclosure also apply to systems mounted on a non-vehicle mobile object or a non-vehicle remote object. In some examples, vehicle 102 may be an aircraft such as an airplane, a helicopter, or a weather balloon or a space vehicle such as a satellite or spaceship. In yet other examples, vehicle 102 may be a land vehicle such as an automobile or a water vehicle such as a ship or a submarine. Vehicle 102 can also be a manned vehicle or an unmanned vehicle, such as a drone, a remote-control vehicle, or any suitable vehicle without any pilot or crew on board.

System 100 may also include an inertial navigation system (INS) for determining a turn rate, velocity, and acceleration for vehicle 102. The INS may be sufficient for stand-alone navigation of vehicle 102 without determining the locations of other vehicles. If system 100 does not have INS (e.g., general aviation (GA) and unmanned vehicles (UVs)), system 100 may include another source of redundant navigation information, such as signals from a base station (e.g., traffic management system 180).

Receiver 110 may be configured to receive surveillance signals 170 from vehicle 160 and/or command signal 190 from traffic management system 180. Receiver 110 may include an automatic-dependent surveillance—broadcast (ADS-B) device capable of receiving ADS-B signals from other vehicles. In other words, receiver 110 may include an ADS-B In receiver. Additionally or alternatively, receiver 110 may include a traffic collision avoidance system (TCAS) receiver and/or an automatic identification system (AIS) receiver.

Transmitter 130 is configured to transmit surveillance signals 132 to other vehicles and stationary receivers. Transmitter 130 may include an ADS-B device capable of transmitting ADS-B signals to other vehicles. In other words, transmitter 130 may include an ADS-B Out transmitter. Transmitter 130 may include or be part of a Mode S transponder. Additionally or alternatively, transmitter 130 may include a TCAS transmitter, a Mode A, C, or S transponder, and/or an AIS transmitter. In some examples, receiver 110 and transmitter 130 may be fully or partially integrated in a single unit. For example, system 100 may include a transceiver that includes receiver 110 and transmitter 130.

Surveillance signals 132 and 170 can include surveillance messages with data indicating the position, velocity, and other information relating to system 100 and vehicles 102 and 160. For example, processing circuitry 120 can determine the location, velocity, track, status, and destination of vehicle 102. In some examples, surveillance signals 132 and 170 include ADS-B data, where each surveillance message lays out the data in a squitter format. In examples in which surveillance signals 132 and 170 include ADS-B data, surveillance signals 132 and 170 can encode data at a frequency of 1090 MHz. Surveillance signals 132 and 170 can also encode ADS-B data at a frequency of 978 MHz for universal access transceiver (UAT) transmissions.

Positioning device 140 is configured to determine the position or location of vehicle 102. Positioning device 140 may include satellite navigation equipment such as a GNSS configured to receive positioning signals from satellites and other transmitters. One example of a GNSS is a Global Positioning System (GPS). Positioning device 140 may be configured to deliver the received positioning signals to processing circuitry 120, which may be configured to determine the position of vehicle 102. Processing circuitry 120 can encode the position and/or velocity in surveillance signals 132 transmitted by transmitter 130.

Memory 150 may be configured to store data indicating the locations, velocities, and other navigational data for vehicles 102 and 160. In some examples, memory 150 may store program instructions, which may include one or more program modules, which are executable by processing circuitry 120. When executed by processing circuitry 120, such program instructions may cause processing circuitry 120 to provide the functionality ascribed to it herein. The program instructions may be embodied in software and firmware. Memory 150 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Vehicle 160 is equipped with a transmitter for transmitting surveillance signals 170. For example, vehicle 160 may have an ADS-B Out transmitter for transmitting ADS-B signals indicating the position and velocity of vehicle 160. Vehicle 160 can encode the location and velocity of vehicle 160 in a surveillance message. Vehicle 160 can transmit the surveillance message as surveillance signals 170.

Traffic management system 180 may be configured to send command signal 190 to system 100 to cause system 100 to transmit surveillance signals 132. Traffic management system 180 can communicate with and direct the movements of vehicles such as vehicles 102 and 160. Traffic management system 180 can provide ground surveillance for unmanned aerial vehicle traffic in the area around system 180. Traffic management system 180 can include an unmanned aircraft system traffic management (UTM) system in the United States or a U-Space system in Europe. Traffic management system 180 can transmit command signal 190 to vehicle 102 to communicate a route, destination, or other commands to vehicle 102. For example, traffic management system 180 can command vehicle 102 to avoid a predefined region or to transmit surveillance signals 132 when vehicle 102 is located in the predefined region.

In some examples, traffic management system 180 may be a traffic control system that directs or controls the movements of vehicles within a predefined region, rather than a dedicated control system or a remote operation system for vehicle 102, such as a remote control for a drone. The traffic control system may be an autonomous system or may be partially or fully under the control of a traffic control system. In some examples, traffic management system 180 can control the movements and/or operation of multiple vehicles instead of controlling the movement of only a single vehicle (e.g., vehicle 102). For example, traffic management system 180 may be a system operated by an air traffic control system who directs air traffic within a predefined airspace. In some examples, traffic management system 180 may be part of an airport, an air traffic control station, and/or an autonomous vehicle management system.

Processing circuitry 120 is configured to determine whether receiver 110 has received surveillance signals 170 or command signal 190. Processing circuitry 120 can decode the signals received by receiver 110 to determine whether receiver 110 has received signal 170 or 190. Processing circuitry 120 can determine that receiver 110 has received signal 170 or 190 by determining that the frequency of a received signal is 1090 MHz or, in some examples, 978 MHz. Processing circuitry 120 can decode a signal received by receiver 110 and process the data to determine the type and/or content of the signal.

Processing circuitry 120 is also configured to suppress the transmission of surveillance signals 132 by transmitter 130 in response to determining that receiver 110 has not received surveillance signal 170 or command signal 190. In response to determining that receiver 110 has received signal 170 or 190, processing circuitry can cause transmitter 130 to begin transmitting surveillance signals 132.

In examples in which transmitter 130 is transmitting surveillance signals 132, processing circuitry 120 can set a timer and clear the timer in response to receiver 110 receiving signal 170 or 190. In response to determining that the timer has reached a threshold level (e.g., thirty seconds, one minute, or two minutes), processing circuitry 120 can begin suppressing the transmission of surveillance signals 132 until processing circuitry 120 later determines that receiver 110 has received signal 170 or 190.

If transmitter 130 never transmits surveillance signals 132, vehicle 160 and other entities will have to determine the position and velocity of vehicle 102 using other means, such as radar or line-of-sight. If an operator of vehicle 160 is not aware of the position and velocity of vehicle 102, vehicle 160 may be more likely to collide with vehicle 102. In contrast, if transmitter 130 constantly transmits surveillance signals 132, surveillance signals 132 are more likely to interfere with surveillance signals 170 and other communication at the frequency of surveillance signals 132. Thus, constant transmission of surveillance signals 132 increases the congestion for the frequency range of surveillance signals 132.

In accordance with the techniques of this disclosure, system 100 can selectively transmit surveillance signals 132 in response to receiving signal 170 or 190. Processing circuitry 120 can suppress transmission of surveillance signals 132 in response to determining that receiver 110 has not received signal 170 or 190. Processing circuitry 120 can also cause transmission of surveillance signals 132 in response to determining that receiver 110 has received signal 170 or 190. As a result, vehicle 102 will transmit surveillance signals 132 only in situations where vehicle 160 is near vehicle 102, traffic management system 180 commands vehicle 102 to transmit surveillance signals 132, or vehicle 102 is located in a predefined region.

The risk of congestion at the frequency of surveillance signals 132 can be mitigated by a combination of techniques. These techniques include reducing the transmission power or the broadcast frequency for low-altitude operations because vehicles operating at low altitudes are often operating at lower speeds than high-altitude vehicles. Given the lower speeds that are common at low altitudes, it may be sufficient to detect other vehicles at lower distances, as compared to higher altitudes. Processing circuitry 120 implements conditional broadcasting based on the operational context (e.g., whether signal 170 or 190 has been received).

In some examples, system 100 can operate in a first surveillance protocol by using a UTM communication/surveillance means, such as cellular (e.g., LTE/5G) channel, but at the same time monitor a different frequency for signal 170 or 190. The monitored frequency can be 1090 MHz (e.g., for ADS-B In functionality). In examples in which processing circuitry 120 determines that a transponder is nearby, whether an ADS-B system or simply a Mode-S address broadcast or replies to Secondary Surveillance Radar, processing circuitry 120 can switch to a second surveillance protocol by causing transmitter 130 to start to transmitting surveillance signals 132 at 1090 MHz to inform other users of the presence of vehicle 102. The transmission can be at low power, reduced broadcast frequency (e.g., 0.5 hertz rather than two hertz), and/or using Downlink Format 18 (DF18), rather than DF17. If traffic management system 180 is aware of vehicles nearby (e.g., first responders), traffic management system 180 could activate the transmission of surveillance signals by vehicle 102 by sending command signal 190. Traffic management system 180 can send command signal 190 via secured (e.g., encrypted) protocol. Traffic management system 180 can transmit command signal 190 at a UTM frequency (e.g., LTE/5G) or a UAT frequency (e.g., 978 MHz).

System 100 can combine UTM-related functions with the specific implementation of ADS-B Out capability ensuring interoperability with existing aviation communication techniques. System 100 may have better interoperability (e.g., ability to communicate with other systems) and collision avoidance compatibility than other systems such as flight alarm (FLARM). In addition, vehicles with traditional surveillance systems may have surveillance and protection with respect to vehicle 102 because system 100 will transmit surveillance messages in response to receiving surveillance messages from a traditional surveillance system.

Figure 2:
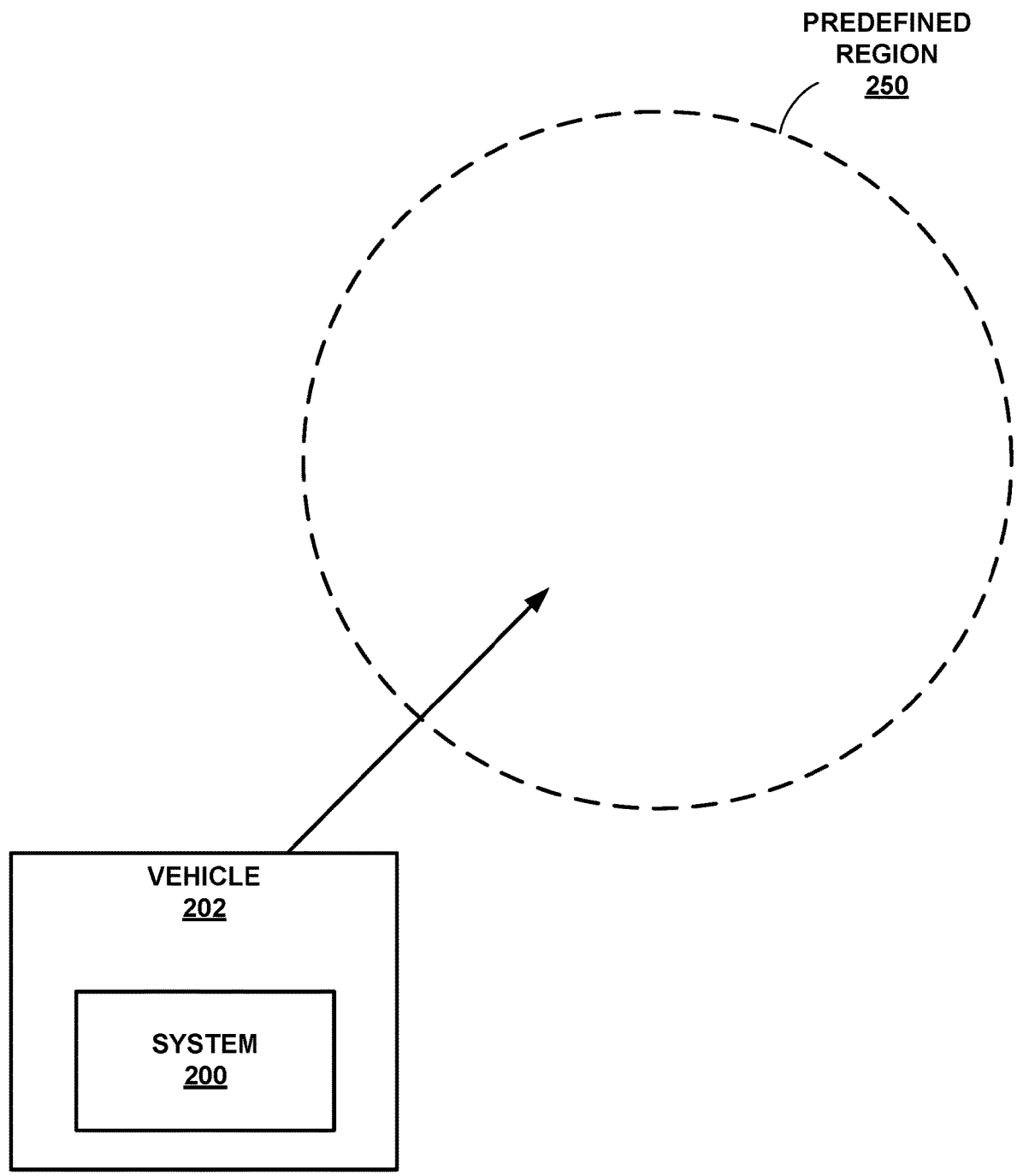
FIG. 2 is a conceptual block diagram of a vehicle entering a predefined region, in accordance with some examples of this disclosure.

FIG. 2 is a conceptual block diagram of a vehicle 202 entering a predefined region 250, in accordance with some examples of this disclosure. Predefined region 250 can be any area where system 200 should transmit surveillance signals to inform other entities of the position and velocity of vehicle 202. For example, predefined region 250 may be the area around an airport, an urban area, a power plant, a sport stadium, or any other sensitive or high-traffic region.

System 200 can determine whether vehicle 202 is located in predefined region 250. In the example shown in FIG. 2, system 200 may determine that vehicle 202 is not located in predefined region 250. In response to determining that vehicle 202 is not located in predefined region 250, system 200 can suppress the transmission of surveillance signals. When vehicle 202 enters the predefined region 250, system 200 can determine that vehicle 202 is now located in predefined 250. In response to determining that vehicle 202 is located in predefined region 250, system 200 can transmit surveillance signals.

Figure 3:
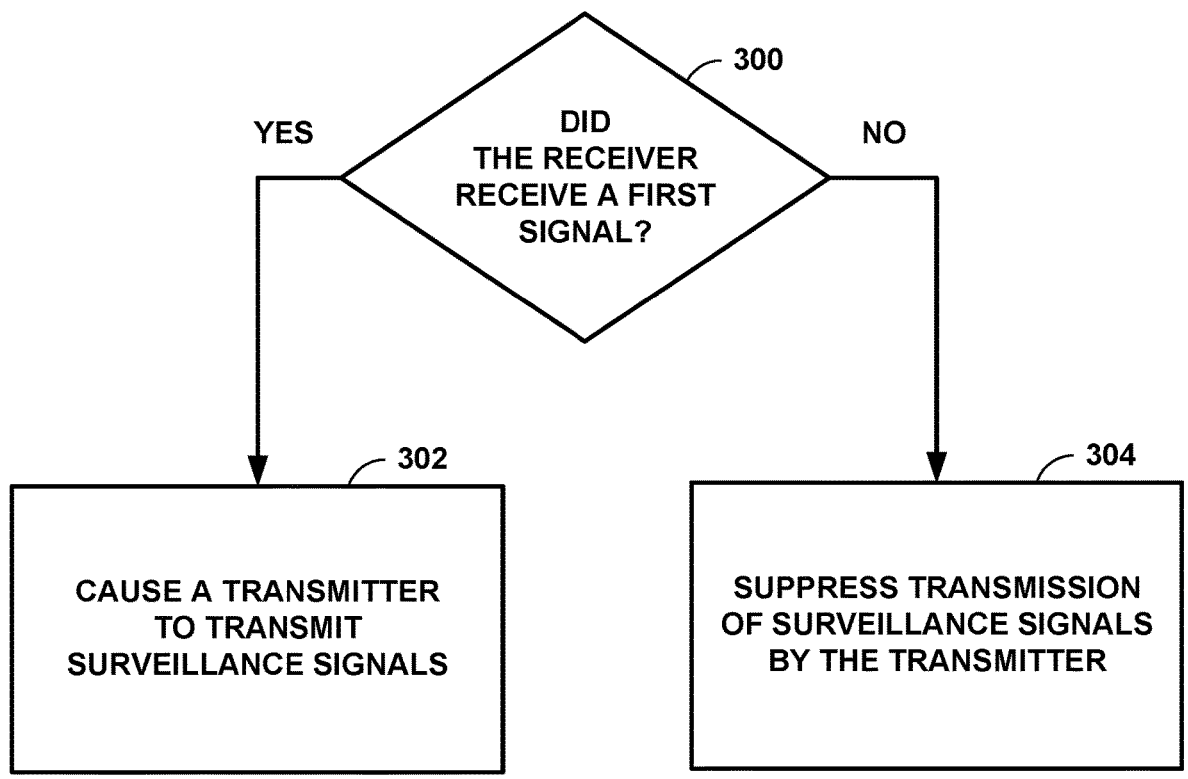
FIG. 3 are flowcharts illustrating an example process for selectively transmitting surveillance signals, in accordance with some examples of this disclosure.
Figure 4:
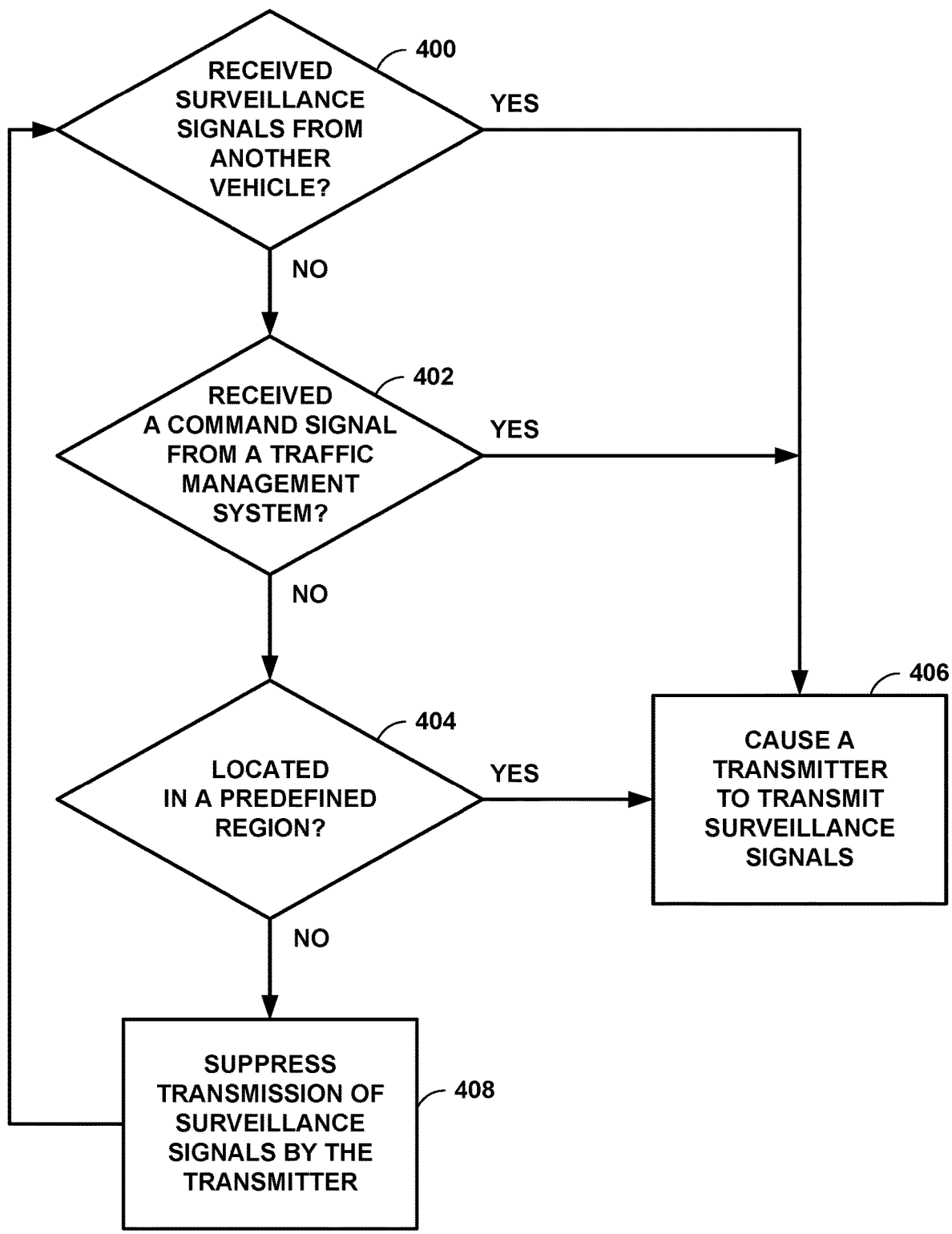
FIG. 4 is a flowchart illustrating an example process for selectively transmitting surveillance signals, in accordance with some examples of this disclosure.

FIG. 3 is a flowchart illustrating an example process for selectively transmitting surveillance signals, in accordance with some examples of this disclosure. The example processes of FIGS. 3 and 4 are described with reference to system 100 shown in FIG. 1, although other components such as system 200 may exemplify similar techniques.

In the example of FIG. 3, processing circuitry 120 determines whether receiver 110 has received signal 170 or 190 (300). In some examples, system 100 can wait and listen, via receiver 110, for signal 170 or 190. In some examples, the frequency of signals 170 and 190 is the same as the frequency of surveillance signals 132. Thus, in the example of aircraft, system 100 can listen for ADS-B signals at 1090 MHz using an ADS-B In receiver. Receiver 110 can also listen for signal 170 or 190 at 978 MHz or at 5G/LTE.

In the example of FIG. 3, processing circuitry 120 causes transmitter 130 to transmit surveillance signals 132 in response to determining that receiver 110 received signal 170 or 190 (302). Processing circuitry 120 causes transmitter 130 to transmit surveillance signals 132 as part of a first surveillance protocol. For example, in response to determining that receiver 110 has received signal 170 or 190, transmitter 130 can transmit ADS-B message that encode data at a frequency of 1090 MHz.

Processing circuitry 120 can also cause transmitter 130 to transmit surveillance signals 132 at lower power or less often. For example, processing circuitry 120 can transmit surveillance signals 132 at a power level of less than five watts, less than three watts, less than two watts, less than one watt, less than one-half of one watt, or less than another power threshold. Processing circuitry 120 can transmit the position reports or surveillance messages less often than twice per second (two Hz), less often than one per second (one Hz), less often than one per two seconds (one-half Hz), or less often than another rate. The frequency of surveillance signals 132 refers to the frequency of the transmitted wave encoding the surveillance messages (e.g., 1090 MHz), whereas the broadcast frequency refers to the frequency that transmitter 130 transmits surveillance messages (e.g., 0.5 hertz).

In the example of FIG. 3, processing circuitry 120 suppresses transmission of surveillance signals 132 by transmitter 130 in response to determining that receiver 110 did not receive signal 170 or 190 (304). Surveillance signals 132 may indicate the position and velocity of vehicle 102. The suppression of surveillance signals 132 may be part of a second surveillance protocol, which may include transmitting signals at a frequency different than surveillance signals 132, such as a cellular frequency or a UAT frequency. Transmitter 130 can transmit at a different frequency while processor 120 is suppressing the transmission of surveillance signals 132. For example, in response to determining that receiver 110 has not received signal 170 or 190, transmitter 130 can instead transmit at a UAT frequency such as 978 MHz or at a cellular frequency such as 800 MHz or 1900 MHz.

In some examples, traffic management system 180 can transmit an electronic command, signal, and/or data packet directing vehicle 102 to transmit surveillance signals 132 or to refrain from transmitting surveillance messages. The electronic command, signal, and/or data packet sent by traffic management system 180 can include a command for vehicle 102 to transmit surveillance signals 132 only at particular times, at particular locations, or at particular altitudes and not transmit surveillance signals 132 at other times, other locations, or other altitudes. Vehicle 102 can cause transmitter 130 to transmit surveillance signals 132 according to the data contained in command signal 190, including under what conditions to refrain from transmitting surveillance signals 132.

Traffic management system 180 may be configured to also send a command to vehicle 102 indicating how frequently (e.g., at what rate) and/or at what power level to transmit surveillance signals 132. The rate of transmission may be how frequently transmitter 130 sends surveillance signals 132 (e.g., twice per second, once per second, or once every two seconds). The rate of transmission may be how frequently transmitter 130 sends a position report, a velocity report, and/or any other report sent by transmitter 130. Traffic management system 180 can encode these commands and parameters into command signal 190 by, for example, setting one or more bits within command signal 190.

By controlling when and under what conditions vehicle 102 transmits surveillance signals 132, traffic management system 180 can control the amount of interference caused by surveillance signals 132. Controlling the interference caused by surveillance signals 132 may be useful in high-traffic areas, areas with military or commercial traffic, and areas near critical infrastructure. Traffic management system 180 may be configured to send command signal 190 to cause vehicle 102 to begin transmitting surveillance signals 132 in response to determining that a manned vehicle (e.g., first responders) is nearby vehicle 102. Thus, the nearby manned vehicle can be made aware of the presence of vehicle 102 by causing vehicle 102 to transmit surveillance signals 132.

FIG. 4 is a flowchart illustrating an example process for selectively transmitting surveillance signals, in accordance with some examples of this disclosure. In the example of FIG. 4, processing circuitry 120 determines whether receiver 110 received surveillance signals 170 from vehicle 160 (400). Processing circuitry 120 can decode the signals received by receiver 110 to determine whether there are any nearby surveillance transmitters, such as vehicle 160. Processing circuitry 120 can determine whether any of the received signals include data encoded at the frequency of surveillance signals 170 in order to determine whether any of the received signals include surveillance message data (e.g., ADS-B squitter data).

In the example of FIG. 4, processing circuitry 120 determines whether receiver 110 received command signal 190 from traffic management system 180 (402). Processing circuitry 120 can decode the signals to determine whether a navigation system or a control system, such as traffic management system 180, has sent command signal 190 to vehicle 102. Processing circuitry 120 can determine whether any of the received signals include data encoded at the frequency of command signal 190 in order to determine whether any of the received signals are command signals. Using command signal 190, traffic management system 180 can send a command to cause vehicle 102 to transmit or refrain from transmitting surveillance signals 132. The command may also include data indicating when to transmit surveillance signals 132, at what frequency to transmit surveillance signals 132, and/or at what power level to transmit surveillance signals 132.

Processing circuitry 120 may be configured to cause transmitter 130 to transmit or refrain from transmitting surveillance signals 132 in response to determining that determining that receiver 110 received command signal 190 from a traffic control system that directs vehicle traffic in a predefined airspace. Additionally or alternatively, processing circuitry 120 may be configured to cause transmitter 130 to transmit or refrain from transmitting surveillance signals 132 in response to determining that determining that receiver 110 received command signal 190 from a traffic management system that controls or directs movements or the operation of multiple vehicles in a predefined region. Processing circuitry 120 may be configured to cause transmitter 130 to transmit or refrain from transmitting surveillance signals 132 in response to determining that determining that receiver 110 received command signal 190 from an unmanned aircraft system traffic management control system or a U-Space control system.

In the example of FIG. 4, processing circuitry 120 determines whether vehicle 102 is located in a predefined region (404). Processing circuitry 120 can determine the position or location of vehicle 102 based on signals and/or data received from positioning device 140. Processing circuitry 120 may be configured to compare the position of vehicle 102 to predefined region(s) stored in a memory of system 100. For example, processing circuitry 120 can determine whether vehicle 102 is within a threshold distance of an airport, an urban area, a power plant, a power distribution, a sport stadium, or any other site or area where transmitter 130 should transmit surveillance signals 132.

In some examples, there may be a predefined region in which processing circuitry 120 suppresses transmission. Processing circuitry 120 may then cause transmission of surveillance signals in response to determining that the vehicle 102 is outside of the predefined region.

The techniques of steps 400, 402, and 404 can be used separately or in any combination, such as steps 400 and 402. Processing circuitry 120 can use any combination or permutation of any of steps 400, 402, and 404, including using fewer than all three steps or using a portion of the steps rather than the full decision blocks shown in FIG. 4. Steps 400, 402, and 404 may be performed in any order, including an order different than the order shown in FIG. 4.

In the example of FIG. 4, processing circuitry 120 causes transmitter 130 to transmit surveillance signals 132 in response to determining that one or more of the conditions in decision blocks 400, 402, and 404 is met (406). Processing circuitry 120 may be configured to cause transmitter 130 to begin transmitting surveillance messages encoding the location and velocity of vehicle 102 in response to determining that one or more of the conditions in decision blocks 400, 402, and 404 is met.

In the example of FIG. 4, processing circuitry 120 suppresses transmission of surveillance signals 132 by transmitter 130 in response to determining that none of the conditions in decision blocks 400, 402, and 404 is met (408). Instead, processing circuitry 120 can cause transmitter 130 to transmit the location of vehicle 102 using another frequency, such as a UAT frequency or a cellular frequency.

Example 1

A method includes determining, by processing circuitry in a first instance, that a receiver has not received a first signal. The method also includes suppressing, by the processing circuitry, transmission of surveillance signals by a transmitter in response to determining that the receiver has not received the first signal. The method further includes determining, by the processing circuitry in a second instance, that the receiver received the first signal. The method includes causing, by the processing circuitry, the transmitter to transmit the surveillance signals in response to determining that the receiver received the first signal.

Example 2

The method of example 1, where determining, in the first instance, that the receiver has not received the first signal includes determining that the receiver has not received a command signal from a traffic management system. Determining, in the second instance, that the receiver received the first signal includes determining that the receiver received the command signal from the traffic management system.

Example 3

The method of examples 1-2 or any combination thereof, where determining, in the first instance, that the receiver has not received the first signal includes determining that the receiver has not received a surveillance message from another vehicle. Determining, in the second instance, that the receiver received the first signal includes determining that the receiver received the surveillance message from the other vehicle.

Example 4

The method of examples 1-3 or any combination thereof, where suppressing the transmission of the surveillance signals includes suppressing transmission of signals by the transmitter in a first frequency range.

Example 5

The method of examples 1-4 or any combination thereof, where determining that the receiver received the first signal includes determining that the receiver received the first signal in the first frequency range.

Example 6

The method of examples 1-5 or any combination thereof, where causing the transmitter to transmit the surveillance signals includes causing the transmitter to transmit the surveillance signals in the first frequency range in response to receiving the first signal.

Example 7

The method of examples 1-6 or any combination thereof, where the first frequency range includes a range of less than fifty megahertz and includes 1090 megahertz.

Example 8

The method of examples 1-7 or any combination thereof, where the first frequency range includes a range of less than fifty megahertz and includes 978 megahertz.

Example 9

The method of examples 1-8 or any combination thereof, where suppressing the transmission of the surveillance signals includes suppressing transmission of signals in a first frequency range.

Example 10

The method of examples 1-9 or any combination thereof, where the method further includes causing the transmitter to transmit surveillance signals in a second frequency range while suppressing transmission of surveillance signals in the first frequency range, the second frequency range being different than the first frequency range.

Example 11

The method of examples 1-10 or any combination thereof, where the second frequency range includes a range of less than fifty megahertz and includes 1900 megahertz.

Example 12

The method of examples 1-11 or any combination thereof, where the second frequency range includes a range of less than fifty megahertz and includes 800 megahertz.

Example 13

The method of examples 1-12 or any combination thereof, where determining that the receiver received the first signal includes determining that the receiver received the first signal from an unmanned traffic management system.

Example 14

The method of examples 1-13 or any combination thereof, further including determining that the first signal commands the processing circuitry to cause the transmitter to transmit the surveillance signals.

Example 15

The method of examples 1-14 or any combination thereof, where causing the transmitter to transmit the surveillance signals includes causing the transmitter to transmit the surveillance signals in response to determining that the first signal commands the processing circuitry to cause the transmitter to transmit the surveillance signals.

Example 16

The method of examples 1-15 or any combination thereof, further including determining that the first signal indicates an entity that transmitted the first signal is transmitting surveillance signals.

Example 17

The method of examples 1-16 or any combination thereof, where causing the transmitter to transmit the surveillance signals includes causing the transmitter to transmit the surveillance signals in response to determining that the first signal commands the processing circuitry to cause the transmitter to transmit the surveillance signals.

Example 18

The method of examples 1-17 or any combination thereof, where causing the transmitter to transmit the surveillance signals includes causing the transmitter to transmit a position report less than once per second.

Example 19

The method of examples 1-18 or any combination thereof, where causing the transmitter to transmit the surveillance signals includes causing the transmitter to transmit a position report less than once per two seconds.

Example 20

The method of examples 1-19 or any combination thereof, where causing the transmitter to transmit the surveillance signals includes causing the transmitter to transmit the surveillance signals at a power of less than five watts.

Example 21

The method of examples 1-20 or any combination thereof, where the transmitter is mounted onboard a vehicle, the method further including determining that the vehicle is located in a predefined region.

Example 22

The method of examples 1-21 or any combination thereof, further including causing the transmitter to transmit the surveillance signals in response to determining that the vehicle is located in the predefined region.

Example 23

The method of examples 1-22 or any combination thereof, further including determining that the vehicle is not located in the predefined region.

Example 24

The method of examples 1-23 or any combination thereof, further including suppressing transmission of the surveillance signals by the transmitter in response to determining that the vehicle is not located in the predefined region

Example 25

The method of examples 1-24 or any combination thereof, where causing the transmitter to transmit the surveillance signals comprises causing the transmitter to transmit a surveillance message indicating a position and a velocity of a vehicle on which the transmitter is mounted.

Example 26

A method includes determining, by processing circuitry onboard a vehicle in a first instance, that the vehicle is not located in a predefined region. The method also includes suppressing, by the processing circuitry, transmission of surveillance signals by a transmitter in response to determining that the vehicle is not located in the predefined region. The method further includes determining, by the processing circuitry in a second instance, that the vehicle is located in the predefined region. The method includes causing, by the processing circuitry, the transmitter to transmit the surveillance signals in response to determining that the vehicle is located in a predefined region.

Example 27

The method of example 26, further including the method of examples 1-25 or any combination thereof.

Example 28

A method includes determining, by processing circuitry in a first instance, that a receiver has not received a command signal from a traffic management system. The method also includes suppressing, by the processing circuitry, transmission of surveillance signals by a transmitter in response to determining that the receiver has not received the command signal from the traffic management system. The method further includes determining, by the processing circuitry in a second instance, that the receiver received the command signal from the traffic management system. The method includes causing, by the processing circuitry, the transmitter to transmit the surveillance signals in response to determining that the receiver received the command signal from the traffic management system.

Example 29

The method of example 28, further including the method of examples 1-25 or any combination thereof.

Example 30

A method includes determining, by processing circuitry in a first instance, that a receiver has not received a surveillance message from another vehicle. The method also includes suppressing, by the processing circuitry, transmission of surveillance signals by a transmitter in response to determining that the receiver has not received the surveillance message from the other vehicle. The method further includes determining, by the processing circuitry in a second instance, that the receiver received the surveillance message from the other vehicle. The method includes causing, by the processing circuitry, the transmitter to transmit the surveillance signals in response to determining that the receiver received the surveillance message from the other vehicle.

Example 31

The method of example 30, further including the method of examples 1-25 or any combination thereof.

Example 32

A system includes a receiver configured to receive a first signal, a transmitter, and processing circuitry configured to determine whether the receiver has received the first signal. The processing circuitry is also configured to cause the transmitter to refrain from transmitting surveillance signals in response to determining that receiver has not received the first signal. The processing circuitry is further configured to cause the transmitter to transmit the surveillance signals in response to determining that receiver has received the first signal.

Example 33

The system of example 32, where the processing circuitry is configured to determine whether the receiver has received the first signal by determining whether the receiver has received a command signal from a traffic management system. The processing circuitry is configured to cause the transmitter to refrain from transmitting surveillance signals in response to determining that receiver has not received the command signal from the traffic management system. The processing circuitry is configured to cause the transmitter to transmit the surveillance signals in response to receiving the first signal in response to determining that receiver has received the command signal from the traffic management system.

Example 34

The system of example 32 or 33, where the processing circuitry is configured to determine whether the receiver has received the first signal by determining whether the receiver has received a surveillance message from another vehicle. The processing circuitry is configured to cause the transmitter to refrain from transmitting surveillance signals in response to determining that receiver has not received the surveillance message from the other vehicle. The processing circuitry is configured to cause the transmitter to transmit the surveillance signals signal in response to determining that receiver has received the surveillance message from the other vehicle.

Example 35

The system of examples 32-34 or any combination thereof, where the processing circuitry is configured to perform the method of examples 1-31 or any combination thereof.

Example 36

A device includes a computer-readable medium having executable instructions stored thereon, configured to be executable by processing circuitry for causing the processing circuitry to determine, in a first instance, that a receiver has not received a first signal. The instructions also cause the processing circuitry to suppress transmission of surveillance signals by a transmitter in response to determining that receiver has not received the first signal. The instructions further cause the processing circuitry to determine, in a second instance, that the receiver received the first signal. The instructions cause the processing circuitry to cause the transmitter to transmit the surveillance signals in response to determining that the receiver received the first signal.

Example 37

The device of example 36, where the instructions further cause the processing circuitry to perform the method of examples 1-31 or any combination thereof.

The disclosure contemplates computer-readable storage media including instructions to cause a processor to perform any of the functions and techniques described herein. The computer-readable storage media may take the example form of any volatile, non-volatile, magnetic, optical, or electrical media, such as a random access memory (RAM), read-only memory (ROM), non-volatile random access memory (NVRAM), electrically erasable programmable read-only memory (EEPROM), or flash memory. The computer-readable storage media may be referred to as non-transitory. A programmer, such as patient programmer or clinician programmer, or other computing device may also contain a more portable removable memory type to enable easy data transfer or offline data analysis.

The techniques described in this disclosure, including those attributed to systems 100 and 200, receiver 110, processing circuitry 120, transmitter 130, positioning device 140, and/or memory 150, and various constituent components, may be implemented, at least in part, in hardware, software, firmware or any combination thereof. For example, various aspects of the techniques may be implemented within one or more processors, including one or more microprocessors, digital signal processors (DSPs), application-specific integrated circuit (ASICs), field-programmable gate arrays (FPGAs), or any other equivalent integrated or discrete logic circuitry, as well as any combinations of such components, embodied in programmers, such as physician or patient programmers, stimulators, remote servers, or other devices. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, where the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices, such as between systems 100 and 200, receiver 110, processing circuitry 120, transmitter 130, positioning device 140, and/or memory 150. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium includes non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein, including, but not limited to, systems 100 and 200, receiver 110, processing circuitry 120, transmitter 130, positioning device 140, and/or memory 150, may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A system comprising:
   a receiver configured to receive communication from a traffic management system;
   a transmitter configured to transmit surveillance messages; and
   processing circuitry configured to:
      determine, in a first instance, that the receiver has not received a command signal from the traffic management system;
      suppress transmission of surveillance messages by the transmitter in response to determining that the receiver has not received the command signal;
      determine, in a second instance, that the receiver received the command signal from the traffic management system; and
      cause the transmitter to transmit the surveillance messages in response to determining that the receiver received the command signal.

2. The system of claim 1, wherein the processing circuitry is configured to cause the transmitter to transmit the surveillance messages in response to determining that the command signal was received from a traffic control system for directing vehicle traffic in a predefined airspace.

3. The system of claim 1, wherein the processing circuitry is configured to cause the transmitter to transmit the surveillance messages in response to determining that the command signal was received from a traffic control system for controlling or directing movements of multiple vehicles in a predefined region.

4. The system of claim 1, wherein the processing circuitry is configured to cause the transmitter to transmit the surveillance messages in response to determining that the command signal was received from an unmanned aircraft system traffic management control system or a U-Space control system.

5. The system of claim 1, wherein the processing circuitry is configured to cause the transmitter to transmit the surveillance messages in response to determining that the command signal includes data commanding the processing circuitry to cause the transmitter to transmit the surveillance messages.

6. The system of claim 1, wherein the processing circuitry is configured to cause the transmitter to transmit the surveillance messages at a particular rate in response to determining that the command signal includes data commanding the processing circuitry to cause the transmitter to transmit the surveillance messages at the particular rate.

7. The system of claim 1, wherein the processing circuitry is configured to cause the transmitter to transmit the surveillance messages at a particular power level in response to determining that the command signal includes data commanding the processing circuitry to cause the transmitter to transmit the surveillance messages at the particular power level.

8. The system of claim 1, wherein the processing circuitry is configured to cause the transmitter to transmit the surveillance signals by causing the transmitter to transmit a position report less than once per second.

9. The system of claim 1, where the processing circuitry is configured to cause the transmitter to transmit the surveillance signals by causing the transmitter to transmit a position report less than once per two seconds.

10. The system of claim 1, where causing the transmitter to transmit the surveillance signals includes causing the transmitter to transmit the surveillance signals at a power of less than five watts.

11. The system of claim 1, wherein the processing circuitry is further configured to:
    determine, in a third instance, that the receiver has not received a surveillance message from another vehicle;
    suppress transmission of surveillance messages by the transmitter in response to determining that the receiver has not received the surveillance message from the other vehicle;
    determine, in a fourth instance, that the receiver received the surveillance message from the other vehicle; and
    cause the transmitter to transmit the surveillance messages in response to determining that the receiver received the surveillance message from the other vehicle.

12. The system of claim 1, wherein the processing circuitry is further configured to:
    determine, in a fifth instance, that the vehicle is not located in a predefined region;
    suppress transmission of surveillance messages by the transmitter in response to determining that the vehicle is not located in the predefined region;
    determine, in a sixth instance, that the vehicle is located in the predefined region; and
    cause the transmitter to transmit the surveillance messages in response to determining that the vehicle is located in a predefined region.

13. A method comprising:
    determining, by processing circuitry in a first instance, that a receiver has not received a command signal from a traffic management system;
    suppressing, by the processing circuitry, transmission of surveillance messages by a transmitter in response to determining that the receiver has not received the command signal;
    determining, by the processing circuitry in a second instance, that the receiver received the command signal from the traffic management system; and
    causing, by the processing circuitry, the transmitter to transmit the surveillance messages in response to determining that the receiver received the command signal.

14. The method of claim 13, wherein causing the transmitter to transmit the surveillance messages is in response to determining that the command signal was received from a traffic control system for directing vehicle traffic in a predefined airspace.

15. The method of claim 13, wherein causing the transmitter to transmit the surveillance messages is in response to determining that the command signal was received from a traffic control system for controlling or directing movements of multiple vehicles in a predefined region.

16. The method of claim 13, wherein causing the transmitter to transmit the surveillance messages is in response to determining that the command signal was received from an unmanned aircraft system traffic management control system or a U-Space control system.

17. The method of claim 13, wherein causing the transmitter to transmit the surveillance messages is in response to determining that the command signal includes data commanding the processing circuitry to cause the transmitter to transmit the surveillance messages.

18. The method of claim 13, further comprising causing the transmitter to transmit the surveillance messages at a particular rate in response to determining that the command signal includes data commanding the processing circuitry to cause the transmitter to transmit the surveillance messages at the particular rate.

19. The method of claim 13, further comprising causing the transmitter to transmit the surveillance messages at a particular power level in response to determining that the command signal includes data commanding the processing circuitry to cause the transmitter to transmit the surveillance messages at the particular power level.

20. A device comprising a computer-readable medium having executable instructions stored thereon, configured to be executable by processing circuitry for causing the processing circuitry to:
    determine, in a first instance, that a receiver has not received a command signal from a traffic management system;
    suppress transmission of surveillance messages by a transmitter in response to determining that the receiver has not received the command signal;
    determine, in a second instance, that the receiver received the command signal from the traffic management system; and
    cause the transmitter to transmit the surveillance messages in response to determining that the receiver received the command signal.

* * * * *